No. 853,911. PATENTED MAY 14, 1907.
S. C. ANKER-HOLTH.
JOURNAL BEARING FOR CENTRIFUGAL MACHINES.
APPLICATION FILED DEC. 14, 1906.
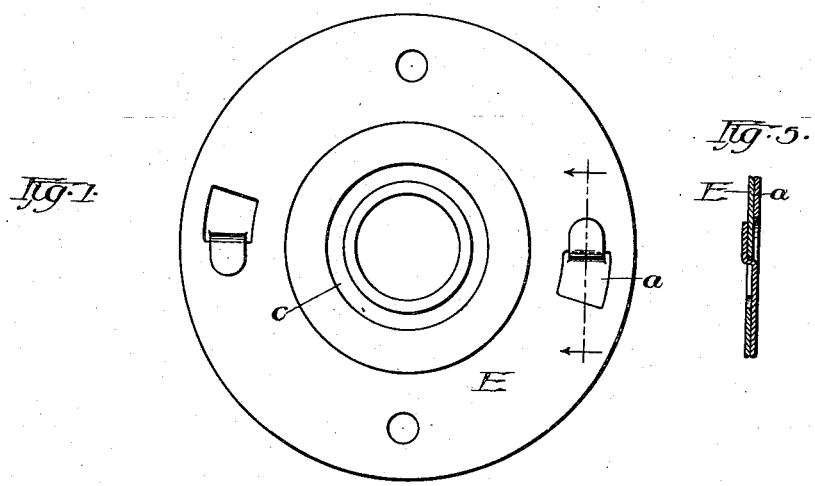
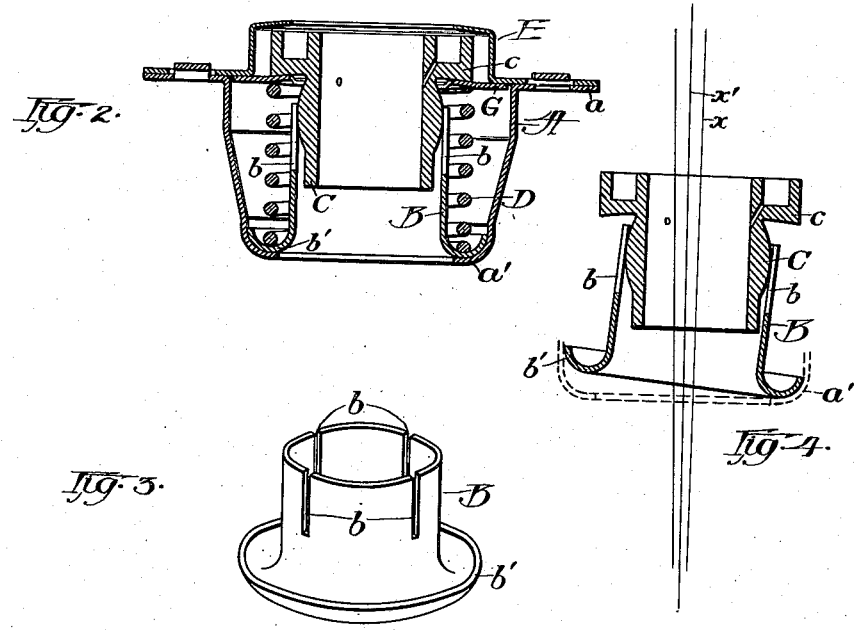
Witnesses:
Inventor:
Severin C. Anker-Holth.
By J. F. Steward
Attorney.

UNITED STATES PATENT OFFICE.

SEVERIN C. ANKER-HOLTH, OF RIVERSIDE, ILLINOIS.

JOURNAL-BEARING FOR CENTRIFUGAL MACHINES.

No. 853,911.　　　　Specification of Letters Patent.　　　　Patented May 14, 1907.

Application filed December 14, 1906. Serial No. 347,814.

*To all whom it may concern:*

Be it known that I, SEVERIN C. ANKER-HOLTH, a citizen of the United States, residing at Riverside, in the county of Cook and State of Illinois, have invented a certain new and useful Improvement in Journal-Bearings for Centrifugal Machines, of which the following is a full description, reference being had to the accompanying drawings, in which—

Figure 1 is a plan view of the cap of the bearing supporting case. Fig. 2 is a sectional elevation of the bearing and its supporting case and devices therein contained. Fig. 3 is a perspective view of the thimble B in which the journal bearing is sustained. Fig. 4 is designed to illustrate the controlling action of the thimble upon the journal bearing, the positions of the parts being exaggerated in order to easily make the object of the invention apparent. Fig. 5 is a sectional view of the means adopted for securing the cap to the journal bearing casing.

The present invention relates to means directed better to control and maintain the journal bearing in proper vertical position than possible when constructed as shown in patent granted to me August 15, 1905, No. 796,981.

A casing A is provided, having a broad flange $a$, by which it may be secured to a fixed part of the main frame of a centrifugal machine—a cream separator in the present instance. At its lower end, at $a'$, the metal constituting it is deflected inward so as to form a base upon which the thimble B may rest. The thimble is provided with longitudinal slots $b$ at its upper end in order that the journal bearing C may be yieldingly and elastically sustained when placed therein, as shown in Figs. 2 and 4. The thimble is provided, at its base, with a wide flange $b'$ adapted to rest upon the inturned flange of the casing A. The bearing C is exteriorly globular where engaged by the elastic portions of the thimble B, and at its upper end is heavily flanged, the flange $c$ being preferably grooved to form an oil recess. All parts of the casing and the thimble are preferably made of sheet metal stamped and pressed to form.

Because of the difficulty of perfectly balancing centrifugal machines adapted to rotate on a vertical axis, provision must be made whereby the journal bearing may shift its position horizontally. For this reason ample space between the bearing and surrounding parts, other than the upper members of the thimble, is provided. Accurate balancing of the bowl so as to run steadily often throws the journal of the spindle slightly eccentric, thus giving it a crank movement, when in rapid rotation. This fact, and the desirability of my present improvement, may be understood by reference to Fig. 4, wherein $x$ may be considered to represent the position of the geometrical center line of a spindle not exactly coincident with the center of gravity of the bowl which it supports. The bearing is shown as thrown to one side.

$x^1$ represents the position of the geometrical center of a spindle of a perfectly balanced bowl, in which case the said line is assumed to be strictly coincident with the center of gravity of the said bowl.

With the shaft having the eccentricity indicated by $x$, the thimble B will be rocked as shown in Fig. 4, and if given half a rotation the thimble will be rocked to lean in the reverse direction; in fact, the thimble will be given a rocking rolling motion by the bearing, the latter being given an orbital movement by the crank-like action of the shaft.

The bearing being forced to shift slightly in its position within the elastic portions of the thimble, the tendency often is to work it either upwardly or downwardly, and my present invention is for the purpose of preventing such result.

Provision is made, as my former patent referred to, for pressing the thimble elastically downward upon its support $a'$. This is accomplished by the spring D, which surrounds the thimble and rests upon the outwardly turned flange at the base thereof. To limit any upward movement of the journal bearing, incident to the shifting movement of the thimble, I provide the disk-like cap plate E, securing it directly upon the flange $a$ of the casing A, but raise it centrally to a distance a little higher than the depth of the flange $c$ of the journal bearing. The plate is centrally open sufficiently to permit the bowl spindle to pass, and the inner surface of the upper portion is preferably given a slight curvature. This cap may be secured to the casing in any manner, but I prefer to cut the metal of the casing in such a manner as to form raised lips, as shown in Figs. 1 and 5, and in the cap provide apertures through which the lips may be passed and be permitted to engage the cap plate when slightly turned relative thereto.

In order that the spring D may have no action whatever upon the journal bearing to force it against the plate immediately above it, I provide a disk G large enough to rest beneath the lower horizontal portion of the cap E, and against this disk I permit the upper portion of the spring D to rest. The disk is provided with an opening sufficiently large to permit the journal bearing to shift position as thrown by any eccentric action of the spindle. The upper flange c of the journal bearing, as above shown in Fig. 2, is seen to be freely sustained between the raised portion of the cap plate E above it and the disk G beneath it, and the spring is prevented from influencing the journal bearing in any manner except through the instrumentality of the thimble B.

What I claim as my invention, and desire to secure by Letters Patent, is:

1. In a journal bearing, a casing having an inwardly-turned flange at its bottom, a bearing-supporting thimble, the latter sustained by the said inwardly-turned flange and elastically pressed thereon, a bearing engaged by said thimble and its lateral movements controlled thereby, said bearing also having a circumferential flange, and limiting plates above and below said circumferential flange, all combined substantially as described.

2. In a journal bearing, a casing having an outwardly-turned flange at its top and an inwardly-turned flange at its bottom, a bearing-supporting thimble, the latter sustained by the said inwardly-turned flange and elastically pressed thereon, a bearing engaged by said thimble and its lateral movements controlled thereby, said bearing also having a circumferential flange, and limiting plates above and below said circumferential flange, said limiting plate above said flange adapted to be locked to the outwardly-turned flange formed on the top of the said casing, all combined substantially as described.

3. In a journal bearing, a casing having an inwardly-turned flange at its bottom, a bearing-supporting thimble provided with an outwardly-turned flange and sustained by the said inwardly-turned flange at the bottom of said casing, a bearing engaged by said thimble and its lateral movement controlled thereby, said bearing also having a circumferential flange, a limiting plate beneath said circumferential flange, elastic means located between said outwardly-turned flange of the thimble and said limiting plate, and a limiting cap-plate above the flange of said bearing, all arranged and combined substantially as described.

SEVERIN C. ANKER-HOLTH.

Witnesses:
B. C. WAIT,
C. R. BEHNISH.